July 11, 1944. G. A. A. KING 2,353,568
HORSESHOE
Filed Jan. 26, 1942 2 Sheets-Sheet 1

INVENTOR
GORDON ALEXANDER ALLAN KING
BY
Whittemore, Hulbert & Belknap
ATTORNEYS

July 11, 1944.　　　　　G. A. A. KING　　　　　2,353,568
HORSESHOE
Filed Jan. 26, 1942　　　2 Sheets-Sheet 2

INVENTOR
GORDON ALEXANDER ALLAN KING
BY
Whittemore, Hulbert & Belknap
ATTORNEYS

Patented July 11, 1944

2,353,568

UNITED STATES PATENT OFFICE 2,353,568

HORSESHOE

Gordon Alexander Allan King, Kew, England
Application January 26, 1942, Serial No. 428,306
In Great Britain October 17, 1941

8 Claims. (Cl. 168—13)

This invention concerns improvements in or relating to horse shoes.

Horse shoes as at present used are made of metal, such as steel. Such shoes are heavy and soon become very slippery and are non-elastic and non-resilient. Generally the shoes have to be applied with heat and due to their lack of resiliency or elasticity have no shock absorbing properties and do not allow for growth of the hoof.

It has been proposed previously to try to overcome some of these difficulties by incorporating resilient materials such as rubber and rubber compositions in a horse shoe, but since such materials are of an elastic and resilient character they have been found to be liable to spread undesirably, this spreading being noticeable in a lateral direction, particularly between the heel end portions of the shoe, and it is thought that this is a reason why shoes of rubber and rubber compositions previously suggested have incorporated in their structure a metal core or base of a rigid character to which the rubber part of the shoe is fixed either by moulding it thereon or by anchoring it thereto in one way or another.

One object of this invention is to provide an improved form of horse shoe which will overcome or reduce the above mentioned disabilities of the ordinary steel horse shoe without necessitating the use of a metal base or core to the shoe, whilst a further object of the invention is to provide a shoe of a resilient character having a considerable resistance to abrasive wear and which is less liable to slip than the normal steel shoe.

According to this invention there is provided an integrally moulded peripheral horse shoe formed from a non-metallic resilient material in which each heel arm is provided at or near its rear extremity with an upstanding cleft stop, such cleft stops being adapted to engage one in each of the lateral clefts of the frog of a horse's hoof.

Preferably the thickness of the shoe decreases from the toe thereof gradually to the heel ends thereof, and the shoe is provided, at the outer edge of each arm thereof, between the toe of the shoe and the cleft stops, with a quarter clip, such quarter clips being adapted to engage respectively at substantially opposite positions the outer periphery of the hoof of a horse. Thus these quarter clips tend to prevent the heel arms of the shoe moving inwardly with respect to the peripheral portions of the hoof whilst the previously mentioned cleft stops prevent the heel portions of the shoe moving outwardly with respect to the hoof. In this way the shoe is locked against the lateral movement with respect to the hoof when it has been nailed thereon. In combination with a toe clip, which is preferably provided on the shoe as is normal practice with horse shoes, the lateral cleft stops also serve to anchor the shoe against fore and aft movement on the hoof.

It is preferred to arrange the lateral cleft stops at the rear extremities of the heel arms and at the inner edges of the latter. The cleft stops are preferably of approximately triangular form in plan and in side elevation, the higher and wider ends of the cleft stops being at the rear extremities of the heel arms, as will become more apparent from the subsequent particular description of an embodiment of the invention. The cleft stops are also preferably chamfered or bevelled off at their outer faces so as more accurately to engage in the lateral clefts of the hoof.

The resilient material from which the shoe is formed is a mouldable one of a durable character and desirably is of rubber or artificial rubber substance. The preferred composition for the material of which the resilient shoe is made by moulding in suitable dies, is one which includes fibres, preferably vegetable fibres, for example wood, wheat straw, oat straw, barley straw, meadow hay, kapok, cocoanut fibre, or fibres such as wools, long horse hair waste, short horse hair waste, dressed hair, hair fibre or synthetic fibres to increase the gripping properties of the shoe, such fibres preferably comprising between 10 to 60% of the total mix from which the shoe is moulded. A most preferred form of mix of this character comprises:

| | Per cent |
|---|---|
| Rubber and/or synthetic rubber (such as that sold under the trade names "Neoprene," "Buna," or "Thiokol" | 37 |
| Fillers | 37 |
| Wood wool fibres | 10 |
| Chemicals | 16 |

The fillers and chemicals referred to are the usual fillers and chemicals used in the compounding of rubber, such as rubber scrap, china clay, softeners, anti-oxidants and accelerators.

The fibrous material, e. g., wood wool, straw, is preferably fed into the rubber mix during the milling process, and the mix is calendered until the fibres are dispersed throughout the compound and are reduced to a relatively small size, having, however, noticeable axial length (e. g., $\frac{1}{16}''$ to $\frac{3}{16}''$) and rigidity which enables them to interlock with one another in the basic component and reduce the intensibility of the basic component which extensibility renders an ordinary rubber compound unsatisfactory when a shoe is nailed to the hoof.

In addition to the reduction of extensibility the fibres supply the rubber or synthetic rubber with non-slip properties due to the difference in the co-efficient of friction of wood and rubber or rubber substitutes, the absorption of moisture by the exposed vegetable fibres and the cavities left in the face of the shoe by the unequal rate of wear of the component materials. Furthermore, the unequal contraction of the vegetable fibres and of the synthetic rubber and/or natural rubber after vulcanisation causes these fibres to stand proud to a limited extent, of the face of the shoe, and this assists in giving the shoe non-slip properties.

Owing to the fact that the shoe is made wholly of resilient material the number of sizes required in manufacture is relatively small since during the shoeing process minor adjustments can be made by contracting or distending the shoe by manual force.

The moulding pressure and temperature and the moulding time used in producing the horse shoe are selected so as to ensure the greatest strength in the finished product consistent with the required degree of resiliency and the obtaining of a product which is not friable.

In order that the invention may be more thoroughly appreciated and may be readily carried into practice one sheet of drawings is appended hereto illustrating one embodiment of the invention by way of example only and in which drawings.

Figure 1:
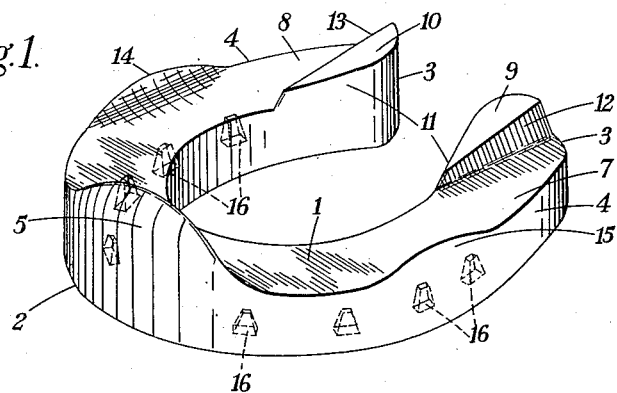
Figure 1 is a perspective view of one form of moulded rubber-fibre horse shoe in accordance with this invention.
Figure 2:
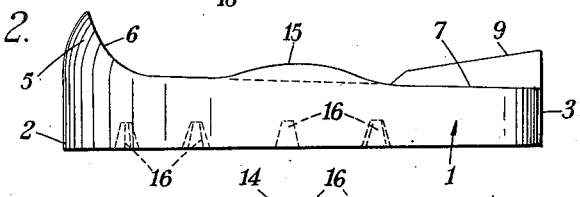
Figure 2 is a side elevation of the same.
Figure 3:
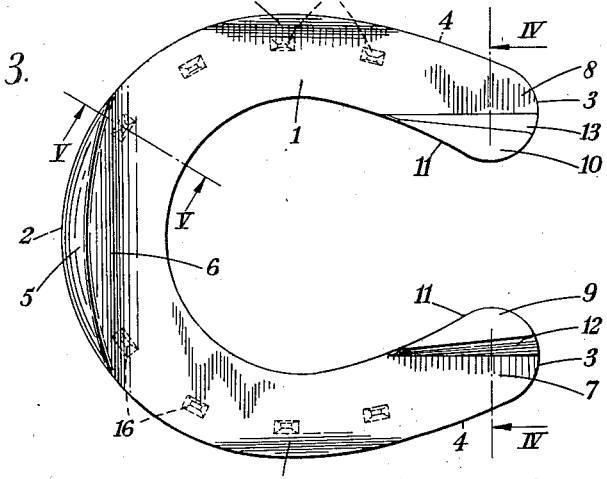
Figure 3 is a plan of the same.

Referring to Figures 1–5 of the drawings it will be seen that the shoe 1 is in plan of approximately the normal shape, but from Figure 2 it will be clearly seen that the shoe decreases in vertical thickness from the toe 2 to the rear ends 3, 3 of the heel arms 4, 4. The shoe 1 is provided with a rolled toe or toe clip 5 which is of substantial proportion and well raised above the top surfaces of the shoe 1. The rear surface 6 of the toe curves downwardly and backwardly so as to merge into the upper surface of the shoe as is very clearly illustrated in Figure 2. The toe clip is highest at the centre of its length and then gradually curves downwardly in a lateral direction so as to die away at its ends, as is clearly seen from Figures 1 and 4.

The heel end portions 7 and 8 of the shoe are provided, respectively, on their upper surfaces and on the inside edges only thereof with upstanding cleft stops 9 and 10. The cleft stops 9 and 10 have their inner edges 11 coincident with the inner perimeters of the heel arms 4 of the shoe, whilst the outer faces 12 and 13 of the cleft stops are rectilinear and diverge from the inner faces 11 of the cleft stops so that the latter each increase in width towards their rear ends so that they are all approximately of wedge or triangular form as seen in plan. The cleft stops 9 and 10 also gradually increase in depth from their front to their rear ends, as is clearly seen in Figure 2 so that here again the cleft stops are of approximately wedge or triangular form in side elevation, the greatest heights of the cleft stops measured from the top surface of the shoe 1 being at their rear ends. The faces 12 and 13 of the cleft stops may be made vertical and then chamfered off by hand when fitting the shoe, but it is preferred to mould the cleft stops with the surfaces 12 and 13 chamfered off as shown in the drawings so that these surfaces of the two cleft stops incline upwardly from the top of the shoe 1 and inwardly towards one another. This is clearly shown in Figures 1, 3 and 4.

The shoe is also provided with a pair of quarter clips. These are marked, respectively, 14 and 15. They are disposed at the outer periphery of the shoe on the upper side thereof approximately midway along the length of the arms 4, 4 of the shoe. They resemble in character the toe clip 5, but are smaller and are adapted to engage over the lateral or side portions of the periphery of the hoof of the horse when the shoe is in position thereon.

It will thus be seen that when the shoe is applied to the hoof of a horse the toe clip 5 engages over the front of the hoof, the quarter clips 14 and 15 engage over lateral opposite face portions of the hoof and the cleft stops 9 and 10 engage in the lateral clefts which occur in the frog of the hoof of a horse on either side of the front and back centre line thereof. In this way the shoe is, when nailed to the hoof, locked against front to back movement, and against the shoe heel arms 4, 4, spreading outwardly or moving inwardly relative to the hoof. However, the shoe may expand as a whole with a growing hoof.

Figure 5:
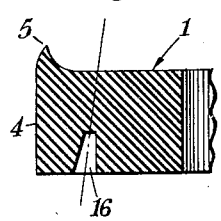
Figure 5 is a vertical section on line V—V Figure 3 looking in the direction of the arrows.
Figure 4:
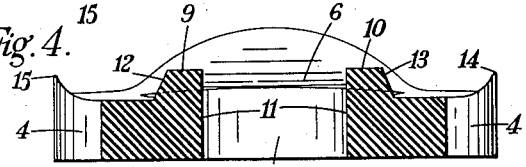
Figure 4 is a vertical section on the line IV—IV Figure 3 looking in the direction of the arrows.

The nail holes of the shoe are shown at 16 and preferably are arranged to incline inwardly and upwardly towards the inner edge of the shoe as is clearly shown in Figure 5. The nail holes only penetrate a portion of the way through the shoe and preferably only constitute recesses for the heads of the nails, the stems of which make their own holes as the nails are driven into position. The nail holes 16, therefore, are preferably made of a truncated pyramidal form. The dimensions of the nail holes are so adjusted that when standard sized horse shoe nails for the particular size of the shoe being fitted are used there is a maximum gripping effect on the nail head so that the nail cannot further penetrate into the shoe during service and so become dangerous due to the clinches standing proud.

Figure 6:
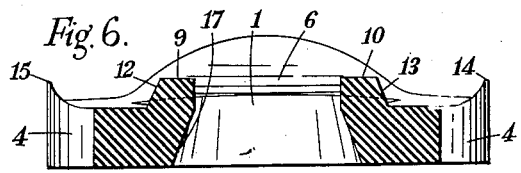
Figure 6 is a similar section to that shown in Figure 4 but illustrates a modified form of a shoe shown in Figures 1-5, in which the inner edge of the shoe is inclined downwardly and outwardly.
Figure 7:
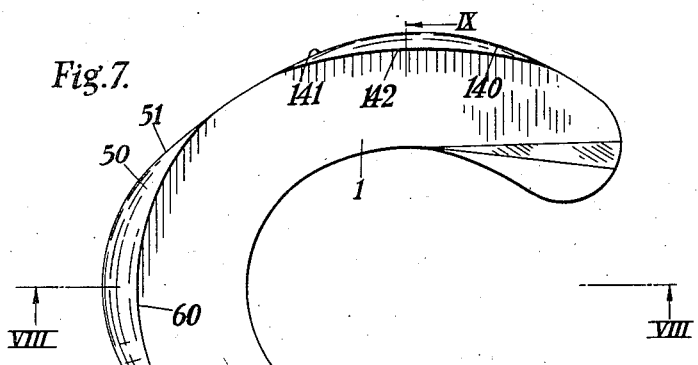
Figure 7 is a top plan of another modified form of the shoe shown in Figures 1 to 5.
Figure 8:
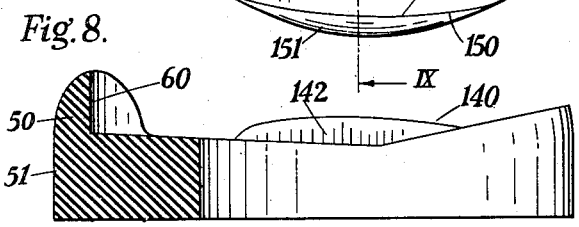
Figure 8 is a vertical section on the line VIII—VIII of Figure 7.
Figure 9:
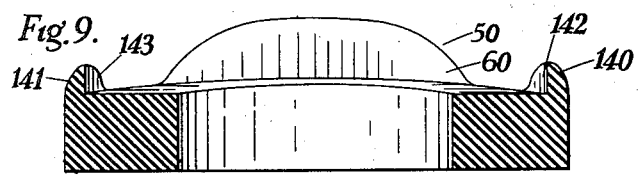
Figure 9 is a vertical section on the line IX—IX of Figure 7.
Figure 10:
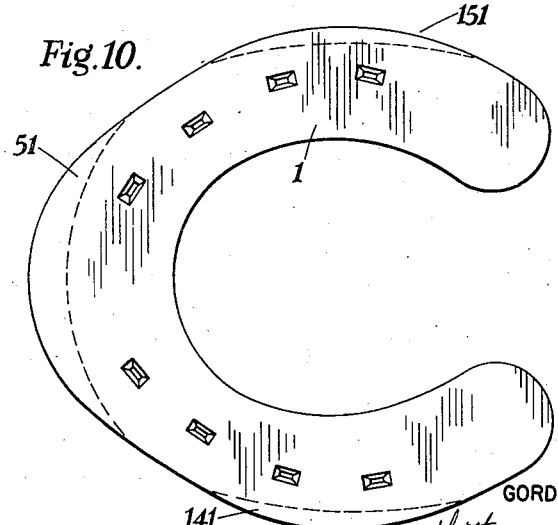
Figure 10 is an underneath plan of the shoe shown in Figures 7 to 9.

Figure 6 illustrates a modification of the horse shoe shown in Figures 1 to 5, the modification consisting solely in forming the inner edge 17 of the shoe so that it inclines downwardly and outwardly so as to reduce the suction created (which, for example, tends to pull off a hunter's shoe) on boggy or heavy land.

The modified shoe illustrated in Figures 7–10 differs primarily from the shoe illustrated in Figures 1-6 in that the toe and quarter clips are somewhat differently formed. In Figures 7-10 the same references are used as far as possible as in Figures 1-6 and it will be seen from Figures 7-10 that the toe clip 50 is provided with an upstanding vertically rectilinear inner surface 60 which is substantially perpendicular to the upper surface of the shoe. The toe clip is formed on a bulge 51 formed at the front of the shoe, so that longitudinally the surface 60 of the toe clip follows approximately the normal contour of the shoe 1.

Like the toe clip 50, the quarter clips 140 and 150 are formed on bulges, respectively, marked 141 and 151 provided at the edge of the shoe and projecting from the normal contour thereof, so that longitudinally the inner surfaces 142 and 143 of the quarter clips lie approximately on the normal contour line of the shoe. The inner surfaces 142 and 143 of the quarter clips are also, like the inner surface 60 of the toe clips, substantially perpendicular to the upper surface of the shoe.

By constructing the shoe in this modified manner the fitting of the shoe to the horse's hoof is made more foolproof than ever, since the toe and quarter clips being outside the normal contour of the shoe they also lie outside the normal periphery of the hoof for which the shoe is designed and, therefore, in fitting the shoe to such hoof there is no danger of a careless workman setting the shoe on the hoof with the latter resting on the tops of the quarter clips or the toe clip instead of firmly on the top surface of the shoe itself. Also by making the surface 60 of the toe clip and the surfaces 142 and 143 of the quarter clips 140 and 150 substantially perpendicular to the upper surface of the shoe, these clips very firmly engage over the upstanding outer surface of the hoof.

The shoes illustrated in the drawings are preferably formed of a moulded rubber fibre material of the preferred composition hereinbefore set forth, so that the shoes are of a highly non-slip character, have the desired degree of resiliency without undue elasticity or liability to spread and have a relatively high resistance to abrasive action and a relatively long life.

In making the shoe of the rubber-fibre material just referred to the natural grain of this rubber-fibre composition may be arranged in any of several ways so as to modify to the required degree the rigidity, abrasion, or slipping resistance of the resilient shoe. For example, the grain of the fibres may be arranged longitudinally along the arms of the shoe so as more or less to follow the curvature of the shoe, or, alternatively, the grain may be arranged transversely of the longitudinal axis of the shoe or again, alternatively, the shoe may be formed so that sections thereof have the grain arranged in different directions to other sections of the shoe. A mould is employed for making the shoe and may be of the positive or plunger type, the vulcanising conditions being selected to give the appropriate characteristics of the resilient shoe according to the type of use to which the shoe may be put. For example, if the shoe is required in which the majority of the fibres extend lengthwise along the shoe, more or less in alignment with the curvature thereof, then the rubber-fibre mix may be worked into a ribbon formation and this ribbon of material laid inside the mould, the mould then being closed and the shoe vulcanised to shape under heat and pressure, the nail holes being formed in the shoe by suitably located projections on one part of the mould.

Horse shoes manufactured and constructed in accordance with the invention above described act as cushions or shock absorbers to the horse's hoof, thus greatly assisting the natural function of the frog of the hoof and reducing risks from springs. Furthermore, the shoes are lighter in weight than steel shoes and require no heat in the shoeing operation. In present times the avoidance of the necessity for inclusion of steel in the making of the shoe is also of importance since in this way an economy of a relatively rare material is effected.

By the term "rubber material" used in the appended claims there is to be understood rubber, or a rubber substitute, or a synthetic rubber, or a mixture of these.

What I do claim as my invention and desire to secure by Letters Patent is:

1. An integrally moulded horse shoe formed of non-metallic resilient material and having at the rear extremity and at the inner edge of each heel arm a single upstanding cleft stop, such cleft stops being adapted to engage in the lateral clefts respectively of the frog of a horse's hoof and said horse shoe being provided, at the outer edge of each arm thereof and between the toe of the shoe and said cleft stops, with a quarter clip, such quarter clips being adapted to engage respectively at substantially opposite positions the outer periphery of the horse's hoof.

2. An integrally moulded horse shoe formed of non-metallic resilient material and having at the rear extremity and at the inner edge only of each heel arm a single upstanding integral cleft stop of approximately triangular form in plan with the wider end at said rear extremity, such cleft stops being adapted to engage in the lateral clefts respectively of the frog of a horse's hoof.

3. An integrally moulded horse shoe formed of non-metallic resilient material and having at the rear extremity and at the inner edge only of each heel arm an upstanding cleft stop of approximately triangular form in plan with the wider end at said rear extremity, such cleft stops being adapted to engage in the lateral clefts respectively of the frog of a horse's hoof and said horse shoe being provided, at the outer edge of each arm thereof and between the toe of the shoe and said cleft stops, with a quarter clip, such quarter clips being adapted to engage respectively at substantially opposite positions the outer periphery of the horse's hoof.

4. An integrally moulded horse shoe formed of non-metallic resilient material and having at the rear extremity and at the inner edge of each heel arm a single upstanding cleft stop of approximately triangular form in plan and in side elevation with the higher and wider end at said rear extremity, such cleft stops being adapted to engage in the lateral clefts respectively of the frog of a horse's hoof and said horse shoe being provided, at the outer edge of each arm thereof and between the toe of the shoe and said cleft stops, with a quarter clip, such quarter clips being adapted to engage respectively at substantially opposite positions the outer periphery of the horse's hoof.

5. An integrally moulded horse shoe formed of non-metallic resilient material and having at the rear extremity and at the inner edge of each heel arm an upstanding cleft stop and, at the front part, an upstanding toe clip, such cleft stops being adapted to engage in the lateral clefts respectively of the frog of a horse's hoof, and said horse shoe being provided, at the outer edge of each arm thereof and between the toe of the shoe and said cleft stops, with a quarter clip, such quarter clips being adapted to engage respectively at substantially opposite positions the outer periphery of the horse's hoof.

6. An integrally moulded peripheral horse shoe formed wholly of non-metallic resilient material, such shoe being of open U-shape and being adapted to have the whole of its under surface bear in use, upon the ground, the shoe having at the rear of each heel arm an upstanding cleft stop of approximately triangular form in plan and in side elevation with the higher and wider end at said rear extremity, such cleft stops being adapted to engage in the lateral clefts respectively of the frog of the horse's hoof, and the shoe also having, at the front part, an upstanding lip having an arcuate inner surface adapted to engage the front of the horse's hoof.

7. An integrally moulded horse shoe formed of non-metallic resilient material and having at the rear end portion of each heel arm a single upstanding cleft stop, such cleft stops being adapted to engage in the lateral clefts respectively of the frog of a horse's hoof, and said horse shoe being provided at the outer edge of each arm thereof, and between the toe of the shoe and said cleft stops, with an upstanding quarter clip, the inner surface of which is substantially perpendicular to the upper surface of the shoe, such quarter clips being adapted to engage respectively at substantially opposite positions the outer periphery of the horse's hoof.

8. An integrally moulded horse shoe formed of non-metallic resilient material and having at the rear end portion of each heel arm a single upstanding cleft stop, such cleft stops being adapted to engage in the lateral clefts respectively of the frog of a horse's hoof, and said horse shoe being bulged outwardly from the outer edge of each arm thereof and each said bulge being extended upwardly to form a quarter clip, the inner surface of each said quarter clip being substantially perpendicular to the upper surface of the shoe and meeting said upper surface substantially at the position at which said bulge begins, such quarter clips being adapted to engage respectively at substantially opposite positions the outer periphery of the horse's hoof, and said horse shoe being also bulged outwardly from the outer edge of the front thereof, and the last mentioned bulge being extended upwardly to form a toe clip, the inner surface of said toe clip being substantially perpendicular to the upper surface of the shoe and meeting said upper surface substantially at the position at which the last-mentioned bulge begins.

GORDON ALEXANDER ALLAN KING.